(12) United States Patent
Furumoto

(10) Patent No.: US 10,518,728 B2
(45) Date of Patent: Dec. 31, 2019

(54) SENSOR PROTECTOR AND VEHICLE EQUIPPED THEREWITH

(71) Applicant: TOYOTA JIDOSHA KABUSHIKI KAISHA, Toyota-shi, Aichi-ken (JP)

(72) Inventor: Kenji Furumoto, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 16/124,839

(22) Filed: Sep. 7, 2018

(65) Prior Publication Data

US 2019/0100162 A1 Apr. 4, 2019

(30) Foreign Application Priority Data

Sep. 29, 2017 (JP) ................................ 2017-190973

(51) Int. Cl.
*B60R 21/0136* (2006.01)
*B60R 19/48* (2006.01)
*B60R 19/30* (2006.01)
*B60R 21/0134* (2006.01)

(52) U.S. Cl.
CPC ........ *B60R 19/483* (2013.01); *B60R 21/0136* (2013.01); *B60R 19/30* (2013.01); *B60R 2021/01345* (2013.01)

(58) Field of Classification Search
CPC ... B60R 19/30; B60R 19/483; B60R 21/0136; B60R 2021/01345; G01S 13/931; G01S 7/02; G01S 2013/9389; G01S 2007/027
USPC ....................................................... 293/117
See application file for complete search history.

(56) References Cited

U.S. PATENT DOCUMENTS

| | | | |
|---|---|---|---|
| 7,506,906 B1 * | 3/2009 | DeHoff | B60R 19/483 293/117 |
| 9,840,216 B2 * | 12/2017 | Dagrossa | B60R 19/44 |
| 2007/0115102 A1 * | 5/2007 | Nakano | G01S 7/521 340/435 |
| 2014/0111950 A1 | 4/2014 | Yamasaki et al. | |
| 2017/0240128 A1 * | 8/2017 | Kashiwagi | B60R 11/00 |

FOREIGN PATENT DOCUMENTS

JP 2007-106199 A 4/2007
WO WO-2016098486 A1 * 6/2016 ............. B60R 11/02

* cited by examiner

*Primary Examiner* — Pinel E Romain
(74) *Attorney, Agent, or Firm* — Sughrue Mion, PLLC

(57) ABSTRACT

There is provided a sensor protector including: mounting portions that are mounted to a bracket for fixing a sensor, which is provided at a vehicle inner side of a bumper cover, to a body of a vehicle; a covering portion that is plate-shaped, that extends from lower portions of the mounting portions toward the bumper cover, and that covers a lower portion of the sensor; and a weak portion that is provided at the covering portion and makes the covering portion elastically deformable.

8 Claims, 6 Drawing Sheets

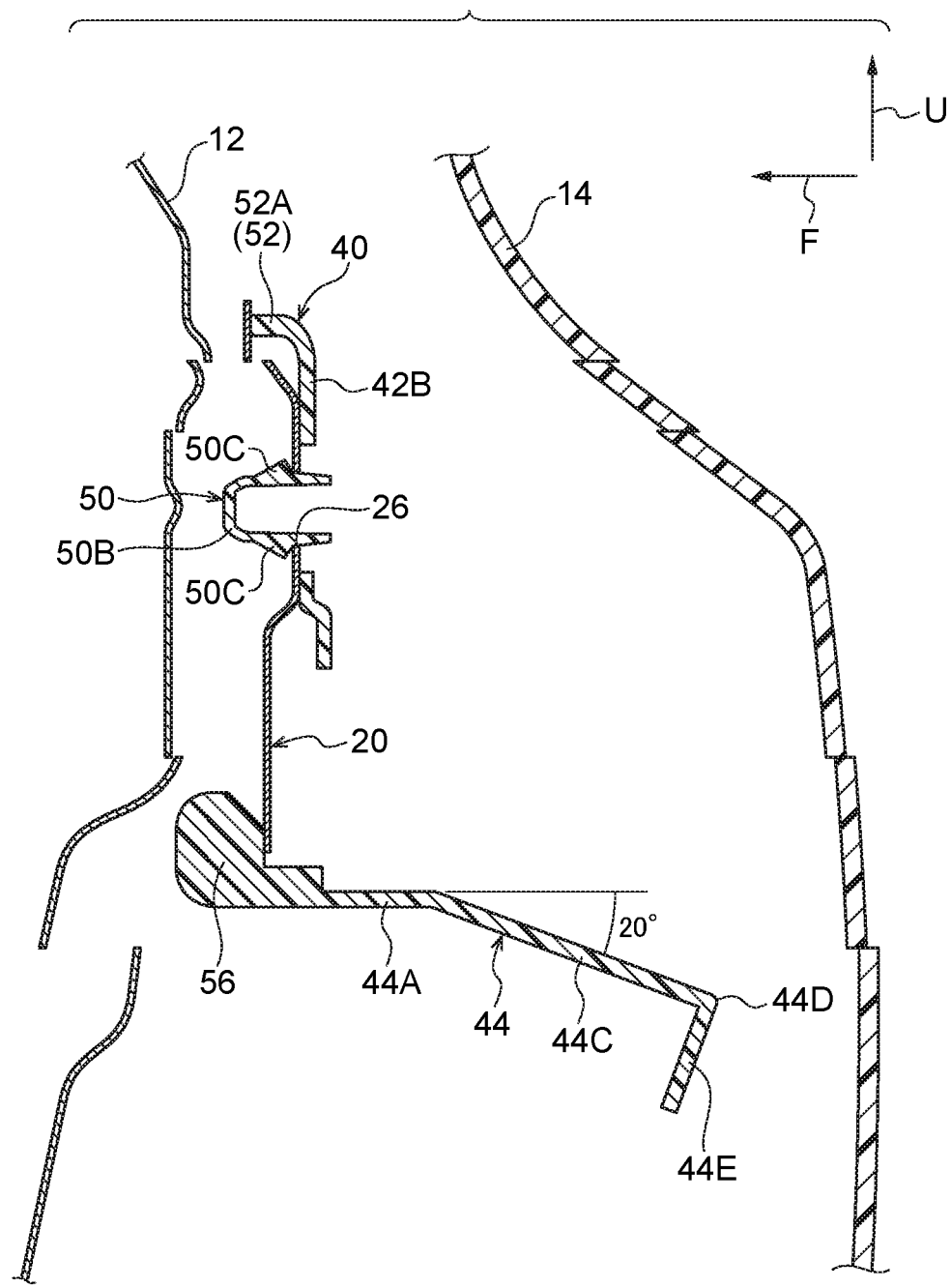

SENSOR PROTECTOR AND VEHICLE EQUIPPED THEREWITH

CROSS-REFERENCE TO RELATED APPLICATION

This application is based on and claims priority under 35 USC 119 from Japanese Patent Application No. 2017-190973 filed on Sep. 29, 2017, the disclosure of which is incorporated by reference herein.

BACKGROUND

Technical Field

The present disclosure relates to a sensor protector and a vehicle equipped therewith.

Related Art

Japanese Patent Application Laid-Open (JP-A) No. 2007-106199 discloses a vehicle periphery monitoring device having a radar that serves as a sensor and that is mounted to an obliquely front side or obliquely rear side of a vehicle. For example, a first radar that is at the left front side of the vehicle is mounted (FIG. 2) to a bumper stay via a radar stay, at the inner side of the front bumper (bumper cover) that is made of resin. Here, in a sensor mounting structure such as that disclosed in JP-A No. 2007-106199, the lower end portion of the bumper cover is fixed to the bumper stay by bolts. Namely, because there is a structure in which impact of the bumper cover is transmitted to a vehicle structural member, at the time of a vehicle collision, there is the concern that the vehicle structural member also will deform due to the impact force.

To address this, there is a structure in which it is difficult for the impact of a bumper cover at the time of a vehicle collision to be transmitted to a vehicle structural member, in a case in Which the lower side of the bumper cover is open and a space is provided between the bumper cover and the vehicle structural member, without the lower end portion of the bumper cover being fixed to the vehicle body. However, there is the concern that stones that are thrown-upward during traveling, or snow that swirls around at the periphery, or the like will penetrate into the bumper cover, and that the sensor will be adversely affected thereby.

For these reasons, it is difficult to achieve both protection of the sensor and lowering of the collision force that is applied from the bumper cover to the vehicle structural member.

SUMMARY

An object of the present disclosure is to provide a sensor protector that can achieve both protection of a sensor and lowering of collision force that is applied from a bumper cover to a vehicle structural member.

A sensor protector of a first aspect includes: mounting portions that are mounted to a bracket for fixing a sensor, which is provided at a vehicle inner side of a bumper cover, to a body of a vehicle; a covering portion that is plate-shaped, that extends from lower portions of the mounting portions toward the bumper cover, and that covers a lower portion of the sensor; and a weak portion that is provided at the covering portion and makes the covering portion elastically deformable.

In accordance with the sensor protector of the first aspect, even in a case in which the lower side of a bumper cover is open and a space is provided between the bumper cover and the vehicle structural member, the lower portion of the sensor is covered by the covering portion. Due thereto, the sensor can be protected even if stones that are thrown-upward during traveling, or snow that swirls around at the periphery, or the like penetrates into the interior of the bumper cover. Further, even in a case in which the amount of deformation of the bumper cover is large and the inner wall of the bumper cover contacts the sensor protector, because the covering portion deforms due to the weak portion, it is difficult for the impact of the bumper cover to be transmitted to the vehicle structural member. As described above, in accordance with the sensor protector of the first aspect, both protecting of the sensor and decreasing of the collision force that is applied from the bumper cover to the vehicle structural member can be achieved.

In a sensor protector of a second aspect, the weak portion comprises a groove that is formed along a width direction of the sensor.

In accordance with the sensor protector of the second aspect, a reduction in the collision force that is applied from the bumper cover to the vehicle structural member can be achieved by the simple structure of merely providing a groove.

In a sensor protector of a third aspect, an end portion of the covering portion at a bumper cover side has a shape that corresponds to the shape of an inner wall of the bumper cover.

Here, "a shape that runs along an inner wall of the bumper cover" means a shape that approximates the outer contour of the portion, which faces the end portion of the covering portion, at the inner wall of the bumper cover. In accordance with the sensor protector of the third aspect, by making the covering portion correspond to the shape of the bumper cover, differences in the mounting positions at the front and the rear and the left and the right, and different types of vehicles, can be accommodated.

In a sensor protector of a fourth aspect, each of the mounting portions has a clip that is anchored to a hole formed in the bracket, and plural ribs that stand upright from the mounting portion, and that push against the bracket in a state in which the clip is anchored to the bracket.

In accordance with the sensor protector of the fourth aspect, by providing a region that pushes against the bracket, the occurrence of rattling at the bracket can be suppressed.

A vehicle of a fifth aspect includes: the sensor protector of any one of the first through fourth aspects; the sensor; the bracket which is fixed to the vehicle body; and the bumper cover which is open at a road surface side of the sensor.

In accordance with the vehicle of the fifth aspect, due to the lower portion of the sensor being covered by the covering portion, the sensor can he protected even if stones that are thrown-upward during traveling, or snow that swirls around at the periphery, or the like penetrates into the interior of the bumper cover. Further, because a space is provided between the bumper cover and the vehicle structural member, it is difficult for impact of the bumper cover to be transmitted to the vehicle structural member at the time of a collision of the vehicle. Further, even in a case in which the amount of deformation of the bumper cover is large and the inner wall of the bumper cover contacts the sensor protector, because the covering portion deforms due to the weak portion, it is difficult for the impact of the bumper cover to be transmitted to the vehicle structural member. As described above, in accordance with the vehicle of the fifth aspect, both protecting of the sensor and decreasing of the collision force that is applied from the bumper cover to the vehicle structural member can be achieved.

In accordance with the present disclosure, both protecting of the sensor and decreasing of the collision force that is applied from the bumper cover to the vehicle structural member can be achieved.

BRIEF DESCRIPTION OF THE DRAWINGS

Exemplary embodiments of the present disclosure will be described in detail based on the following figures, wherein:

FIG. 6 is a side sectional view (a cross-sectional view along line B-B of FIG. 2) of the sensor protector relating to the embodiment of the present disclosure.

DETAILED DESCRIPTION

Figure 1:
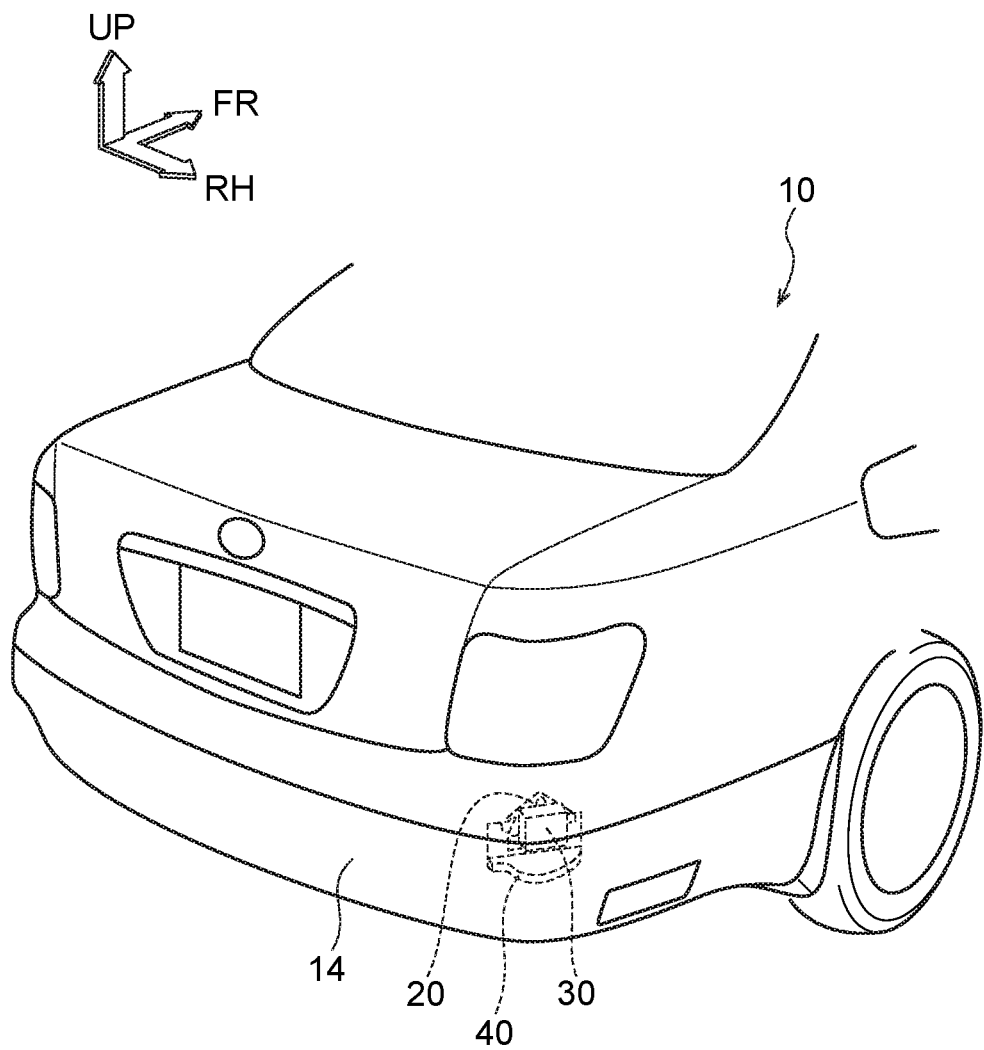
FIG. 1 is a rear perspective view of a vehicle to which a sensor protector relating to an embodiment of the present disclosure is mounted.

A vehicle 10, to which a sensor protector 40 relating to an embodiment of the present disclosure is mounted, is described hereinafter by using FIG. 1. The sensor protector 40 is described by using FIG. 2 through FIG. 6. Note that, in FIG. 1, arrow FR indicates the vehicle forward direction, arrow UP indicates the vehicle upward direction, and arrow RH indicates the vehicle transverse direction right side. Further, in FIG. 2 through FIG. 6, arrow F indicates the device frontward direction, arrow U indicates the device upward direction, and arrow W indicates the device width direction.

(Basic Structure)

Figure 2:
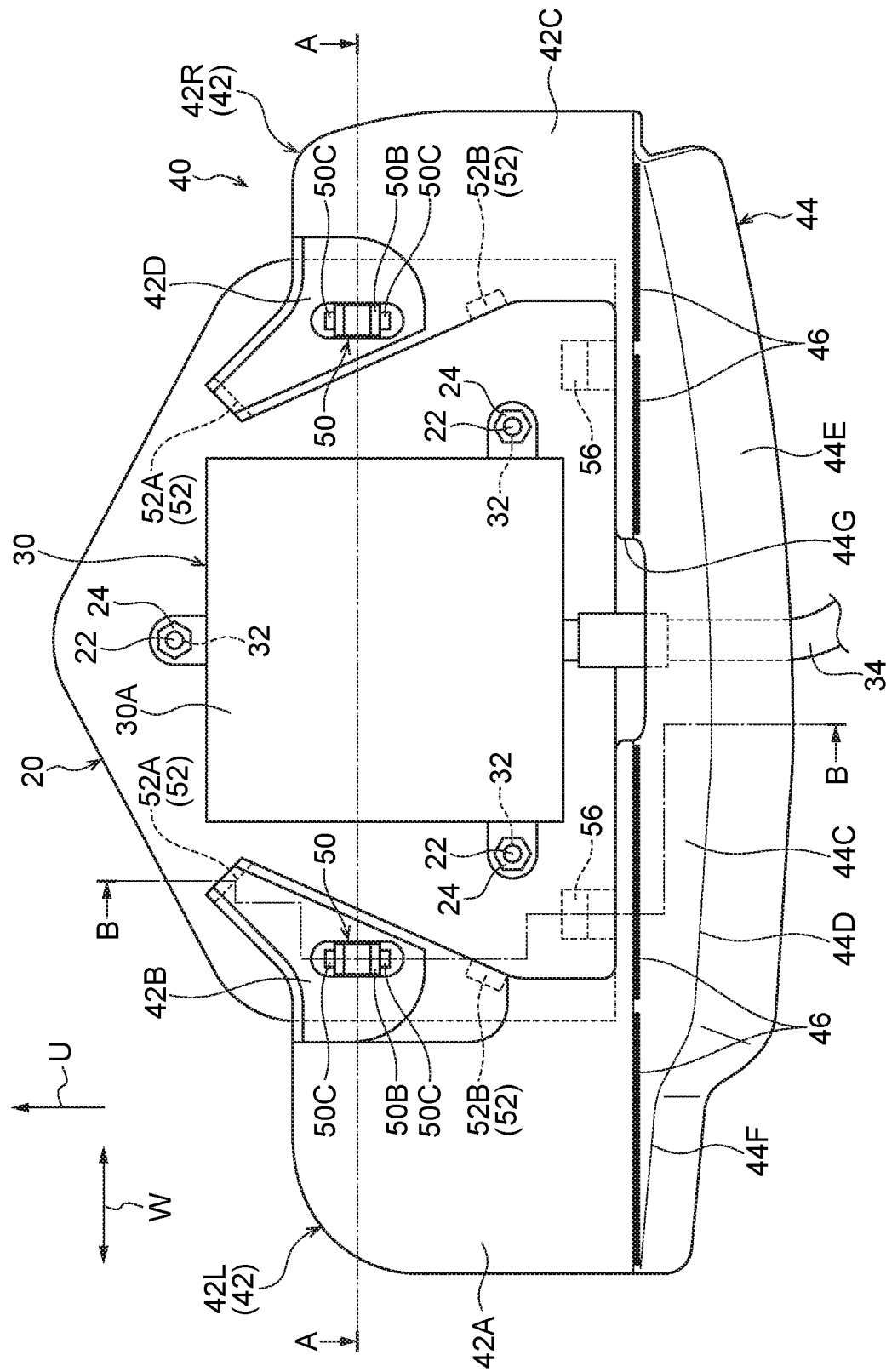
FIG. 2 is a rear view of a sensor, a bracket, and the sensor protector relating to the embodiment of the present disclosure.

A sensor 30, which is an example of a sensing device for sensing obstacles at the periphery of the vehicle, is mounted to the vehicle 10 relating to the present embodiment at a corner portion of the vehicle. FIG. 1 shows the sensor 30 that is at the vehicle right rear side. The sensor 30 is provided at the vehicle inner side of a bumper cover 14, and is fixed to a bracket 20 that is formed by a metal plate. The bracket 20 is fixed (see FIG. 2) by welding to a back panel 12 that serves as a vehicle structural member that structures the vehicle body. To describe this further, as shown in FIG. 2, three bolts 22, which are formed so as to project-out from the device rear side surface of the bracket 20, are provided at the bracket 20. The bolts 22 are formed at three places that are the device width direction both ends and the device upper side end portion of the sensor 30. The three bolts 22 are inserted-through bolt holes 32 that correspond respectively thereto, and are screwed-together with nuts 24. Due thereto, the sensor 30 is fixed to the bracket 20.

The sensor 30 that is mounted to the vehicle right rear side in the present embodiment is fixed to the vehicle 10 in a state in which a transmitting/receiving surface 30A of the sensor 30 is in a state of being inclined 50° (the angle from arrow X to arrow Y in FIG. 5) with respect to the vehicle longitudinal direction. The sensor 30 can sense obstacles by emitting radio waves (millimeter waves) from the transmitting/receiving surface 30A and receiving radio waves that have been reflected back from obstacles.

Here, the road surface side, i.e., the vehicle lower side, of the bumper cover 14 of the vehicle 10 of the present embodiment is open with respect to the sensor 30. Namely, at the vehicle lower side, a space is provided between the bumper cover 14 and the back panel 12 (see FIG. 6). Therefore, the sensor protector 40 is provided so that stones that are thrown-upward during traveling, or snow that swirls around at the periphery, or the like do not penetrate in from the vehicle lower side with respect to the sensor 30. Details of the sensor protector 40 are described hereinafter.

(Sensor Protector)

Figure 3:
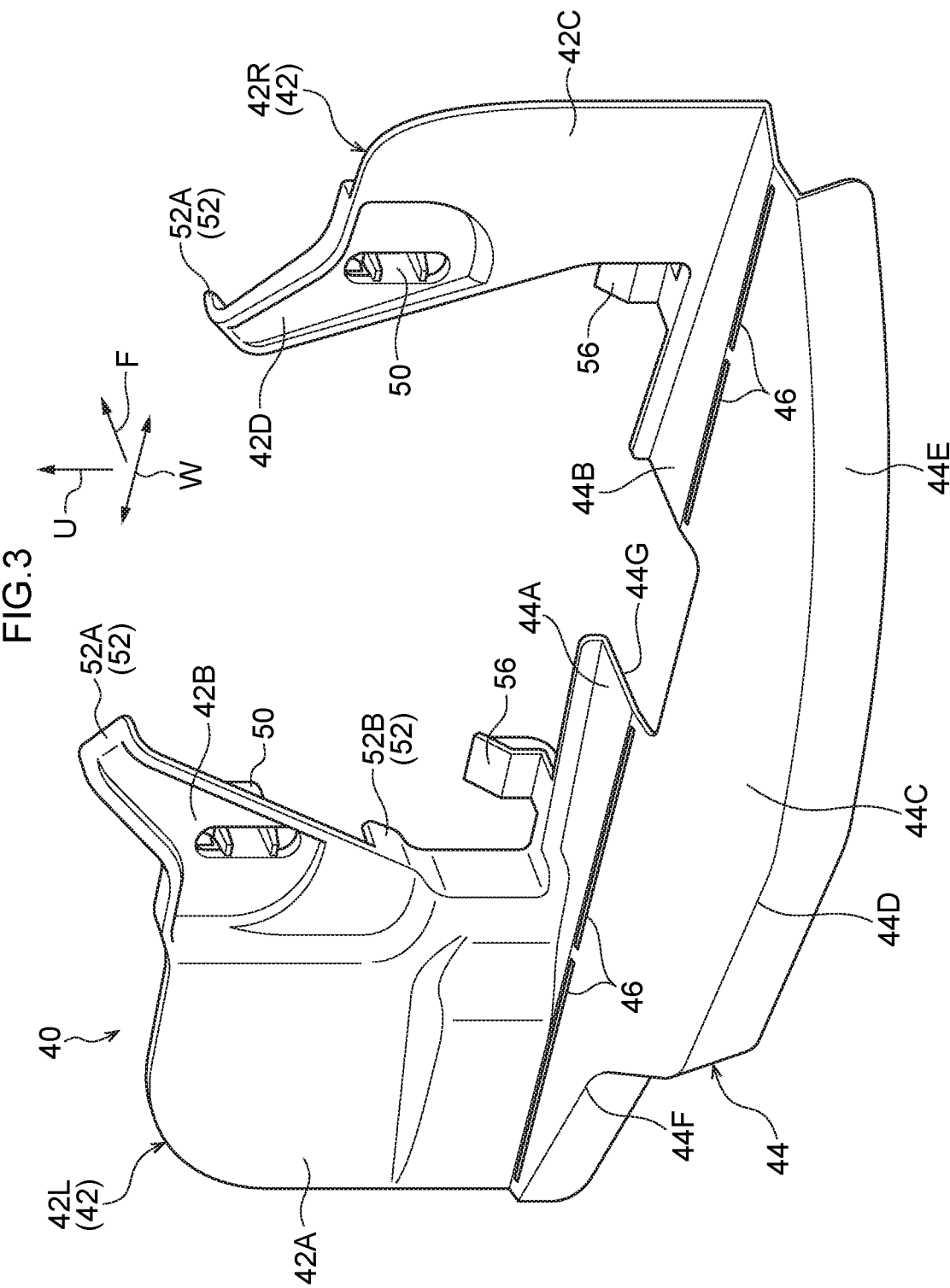
FIG. 3 is a perspective view, which is seen from a device rear side, of the sensor protector relating to the embodiment of the present disclosure.
Figure 4:
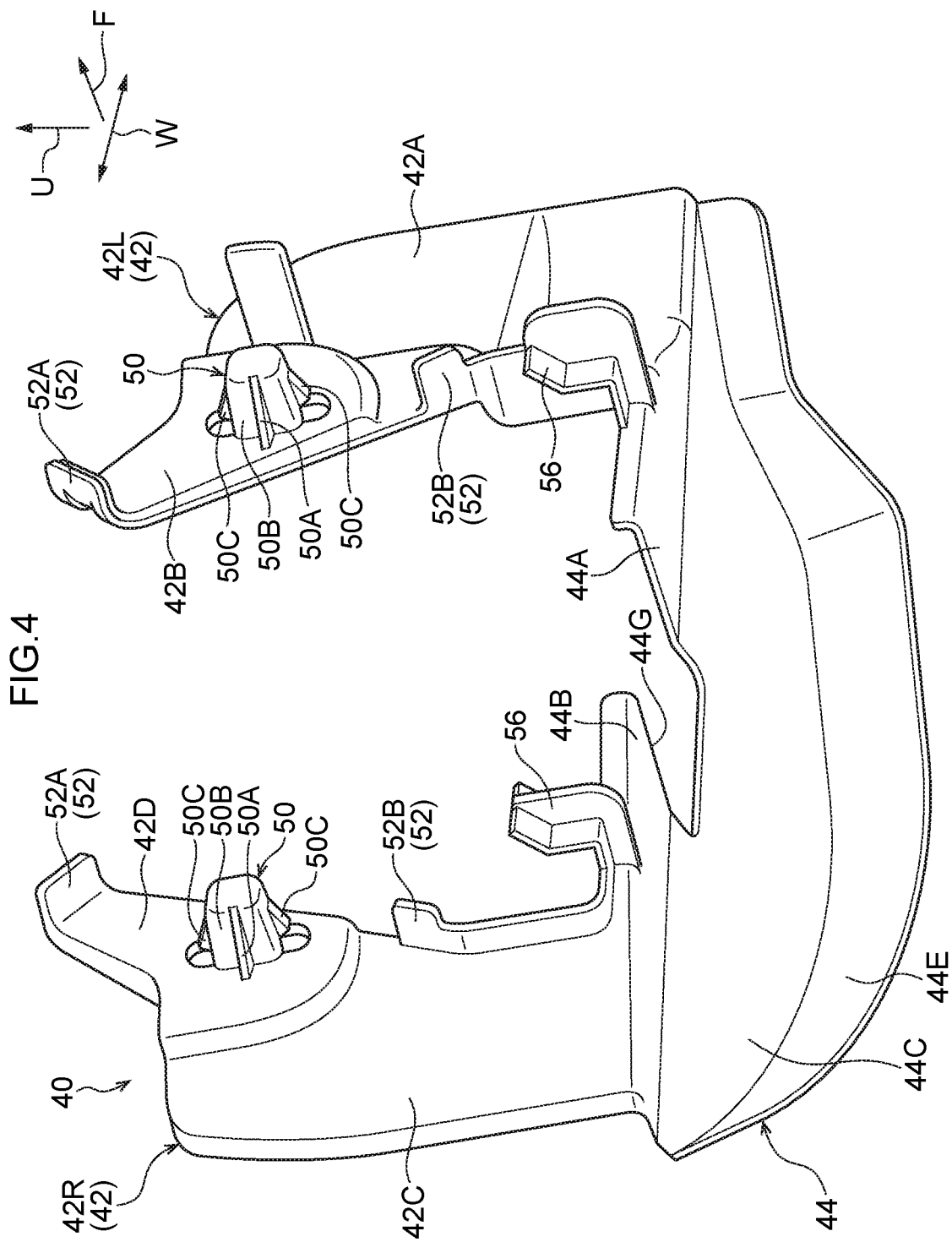
FIG. 4 is a perspective view, which is seen from a device front side, of the sensor protector relating to the embodiment of the present disclosure.

The exterior of the sensor protector is shown in FIG. 2 through FIG. 4.

As shown in FIG. 2 and FIG. 3, the sensor protector 40 of the present embodiment has a pair of mounting portions 42 that extend in the device vertical direction, a covering portion 44 that extends from the device lower end portions of the pair of mounting portions 42 toward the bumper cover 14 side (see FIG. 6), and a groove portion 46 that is provided at the covering portion 44. The sensor protector 40 is formed of a resin such as polyacetal (POM), polybutylene terephthalate (PBT) or the like.

As shown in FIG. 2, the mounting portions 42 are plate-shaped members that are provided as a pair in the device width direction with the sensor 30 disposed therebetween, and are a left side mounting portion 42L that is at the device width direction left side and a right side mounting portion 42R. The left side mounting portion 42l, has an upright portion 42A that extends in the device vertical direction and is substantially L-shaped when viewed from the device rear side, and an extending portion 42B that extends toward the device upper side and width direction inner side from the upright portion 42A. Further, the right side mounting portion 42R has an upright portion 42C that extends in the device vertical direction and is substantially L-shaped when viewed from the device rear side, and an extending portion 42D that extends toward the device upper side and width direction inner side from the upright portion 42C.

Further, as shown in FIG. 2 and FIG. 4, each of the mounting portions 42 has a clip 50, ribs 52 and a hook 56. The ribs 52 are an upper rib 52A that is at the device upper side of the mounting portion 42, and a lower rib 52B that is at the device lower side.

Concretely, the clip 50 at the left side mounting portion 42L is formed so as to project-out toward the device front side at the substantial center in the device vertical direction of the extending portion 42B, at a position that is toward the device upper side of the upright portion 42A. Further, the upper rib 52A at the left side mounting portion 42L is formed so as to project-out toward the device front side at the distal end of the extending portion 42B. The lower rib 52B at the left side mounting portion 42L is formed so as to project-out toward the device front side at the device lower side of the extending portion 42B.

On the other hand, the clip 50 at the right side mounting portion 42R is formed so as to project-out toward the device front side at the device lower side of the extending portion 42D, at a position that is toward the device upper side of the upright portion 42C. Further, the upper rib 52A at the right side mounting portion 42R is formed so as to project-out toward the device front side at the distal end of the extending portion 42D. The lower rib 52B at the right side mounting portion 42R is formed so as to project-out toward the device front side at a position that is at the device lower side with respect to the extending portion 42D.

As shown in FIG. 4, the clip 50 has a supporting portion 50A, which is plate-shaped and projects outward from the extending portion 429 or the extending portion 42D toward the device front side, and a holding portion 50B (see FIG. 6), which is substantially C-shaped with a device rear side that is open and which extends from the device front side end portion of the supporting portion 50A toward the device rear side. Further, two claw portions 50C are formed, with one above and one below the holding portion 50B. Here, as shown in FIG. 6, the holding portion 50B is formed such that the device rear side thereof is elastically deformable along the device vertical direction, and the respective claw portions 50C are formed so as to be able to approach one another in the device vertical direction. Here, a mounting hole 26 is provided in the bracket 20 at a position corresponding to the clip 50. The sensor protector 40 is fixed to the bracket 20 due to the clips 50 being inserted through the mounting holes 26 and the claw portions 50C being anchored to the bracket 20.

Here, in the present embodiment, when the anchored position of the clip 50 on the bracket 20 in the device front-rear direction is taken as a reference position, the ribs 52 (the upper rib 52A, the lower rib 52B) are set at dimensions such that they project outward from the bracket 20 toward the device front side by about 0.3 mm. Accordingly, when the clips 50 are anchored to the bracket 20, the ribs 52 move rearward 0.3 mm toward the device rear side. As described above, the sensor protector 40 of the present embodiment is made of resin, and, although the ribs 52 move rearward toward the device rear side, the clips 50, due to elastic force, generate a pushing force toward the device front side. Namely, in the present embodiment, in the state in which the clips 50 are anchored to the bracket 20, the ribs 52 push against the bracket 20. Further, a pulling-in force toward the device rear side is generated at the clips 50 that are disposed between the upper ribs 52A and the lower ribs 52B.

The mounting portions 42 have the pair of hooks 56 at the upright portion 42A and the upright portion 42C. Concretely, the hook 56 at the left side mounting portion 42L is formed so as to project-out from the upright portion 42A toward the device upper side, at a substantially intermediate position between the clip 50 and the upper rib 52A in the device width direction. Further, the hook 56 at the right side mounting portion 42R is formed so as to project-out from the upright portion 42C toward the device upper side, at a substantially intermediate position between the clip 50 and the upper rib 52A in the device width direction.

As shown in FIG. 3, the covering portion 44 is a plate-shaped member that extends from the device lower end portions of the pair of mounting portions 42 toward the bumper cover 14 side (see FIG. 6). Specifically, the covering portion 44 extends toward the device rear side from the device lower end portions of the upright portion 42A and the upright portion 42C of the mounting portions 42. The covering portion 44 has a base portion 44A as a plate portion, which extends toward the device rear side from the upright portion 42A of the mounting portion 42, and a base portion 44B as the plate portion, which extends toward the device rear side from the upright portion 42C. Further, the covering portion 44 has a protecting plate portion 44C as the plate portion, which is formed continuously from the base portion 44A and the base portion 44B and extends toward the device rear side and the device lower side, and a wall portion 44E, which extends from the outer edge portion of the protecting plate portion 44C orthogonally toward the device lower side.

Figure 5:
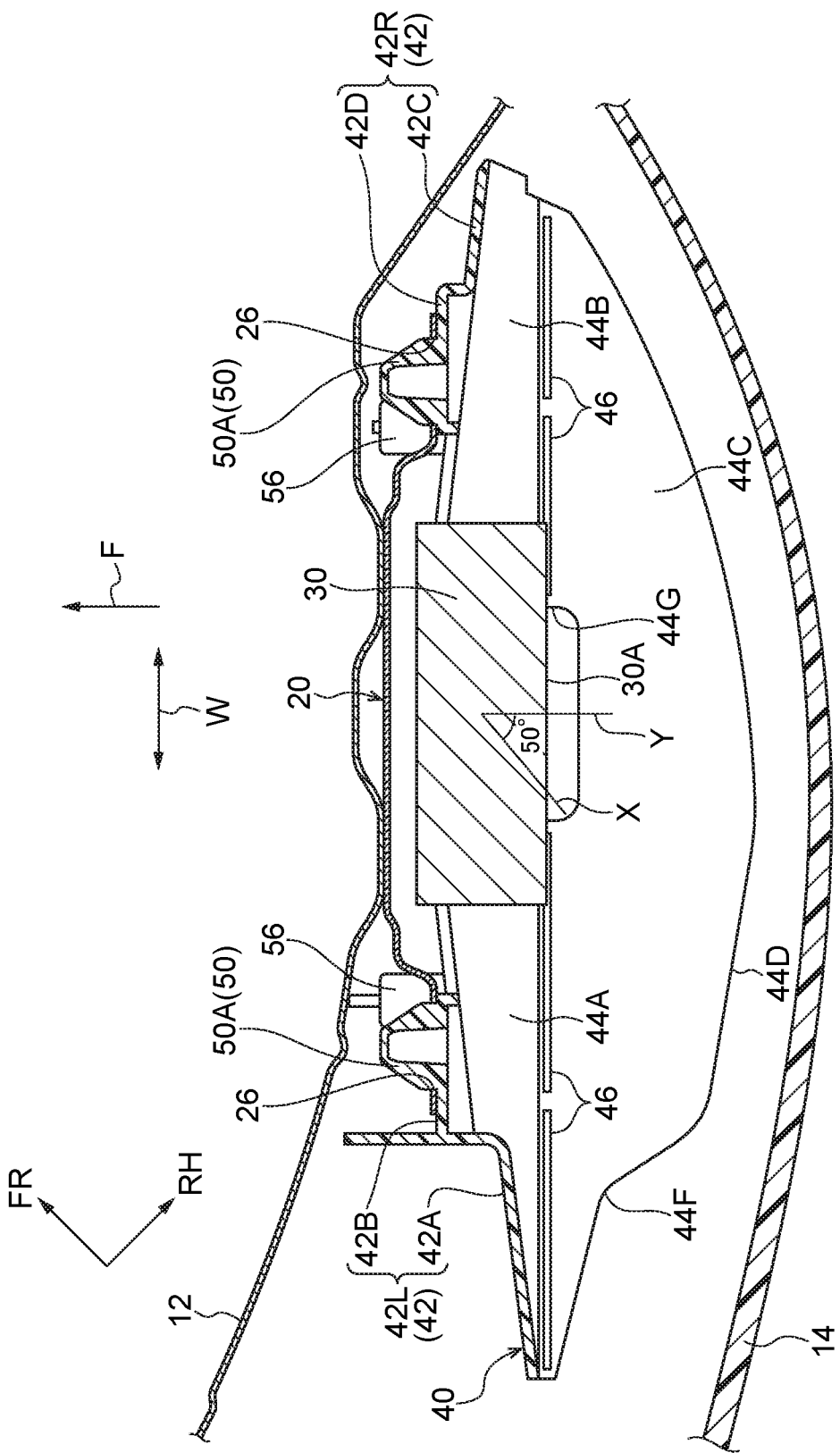
FIG. 5 is a plan sectional view (a cross-sectional view along line A-A of FIG. 2) of the sensor protector relating to the embodiment of the present disclosure.

Here, the protecting plate portion 44C is in a state in which the device rear side thereof is inclined 20° with respect to the device front-rear direction (see FIG. 6). Further, as shown in FIG. 5, when seen from the device upper side, the protecting plate portion 44C has an arcuate portion 44D and a cut-out portion 44F that serve as the bumper cover 14 side end portion of the covering portion 44. The arcuate portion 44D structures a substantially arc-shaped outer peripheral portion from the right side in the device width direction toward the left side. This arcuate portion 44D is formed along the inner wall of the bumper cover 14. To describe this further, the arcuate portion 44D has a shape that approximates the outer contour of the portion that faces the arcuate portion 44D at the inner wall of the bumper cover 14. Further, the cut-out portion 44F is a shape formed by removing a portion of the arc of the arcuate portion 44D at the left side in the device width direction (the vehicle transverse direction inner side) of the arcuate portion 44D.

Further, as shown in FIG. 3, the covering portion 44 has, at the device front side thereof and the device width direction central portion thereof, an open portion 44G that opens toward the device front side. Namely, when the sensor protector 40 is viewed from the device upper side, the device front side of the covering portion 44 is cut out in a substantially rectangular shape by the open portion 44G.

The groove portions 46 are four grooves that are formed at the device upper side surface of the covering portion 44 in a row along the device width direction. The groove portions 46 are provided at the joined portion of the base portion 44A and the protecting plate portion 44C, and at the joined portion of the base portion 44B and the protecting plate portion 44C. Here, the device width direction along which the groove portions 46 of the present embodiment are formed is a direction orthogonal to a line connecting the shortest distance between the bumper cover 14 and the back panel 12. The groove portions 46 of the present embodiment are formed as weak portions that make the covering portion 44 elastically deformable.

(Manufacturing Method)

Processes of manufacturing the sensor 30 and the sensor protector 40 of the present embodiment, which are structured as described above, at the right rear side of the vehicle 10 (see FIG. 1) are described.

First, the bracket 20 that is formed from a metal plate is fixed in advance by welding to the back panel 12 (see FIG. 5). Due thereto, the bracket 20 is fixed in a state of being inclined 50° with respect to the vehicle longitudinal direction. Next, as shown in FIG. 2, the sensor 30 is fixed to the bracket 20. As described above, the three corresponding bolts 22 of the bracket 20 are inserted-through the bolt holes 32 that are provided in the sensor 30, and the respective bolts 22 are screwed-together with the nuts 24. The sensor 30 is thereby fixed to the bracket 20.

Next, as shown in FIG. 6, the sensor protector 40 is mounted to the bracket 20. First, the sensor protector 40 is made to approach the bracket 20 from the device lower side, and the hooks 56 are made to abut and are anchored to the device lower edge portion of the bracket 20. Then, with the hooks 56 anchored to the bracket 20, the device upper side of the sensor protector 40 is rotated toward the device front side, and the pair of clips 50 are inserted through the corresponding mounting holes 26.

Here, at the time when the pair of claw portions 50C ride-over the mounting hole 26, due to the holding portion 50B elastically deforming in a direction in which the diameter thereof decreases, the pair of claw portions 50C approach one another and pass-through the mounting hole 26. Then, after the pair of claw portions 50C pass-through the mounting hole 26, the diameter of the holding portion 50B increases, and, due thereto, the claw portions 50C are anchored to the outer edge portion of the mounting hole 26. Due thereto, the sensor protector 40 is fixed to the bracket 20. Note that a harness 34 that extends from beneath the sensor 30 is accommodated in the open portion 44G (see FIG. 2).

Similarly, after the sensor 30 and the sensor protector 40 are mounted to the left rear side of the vehicle 10 as well, the bumper cover 14 is mounted to the vehicle 10. The bumper cover 14 is fixed to, for example, the back panels 12 or a rear fender (not illustrated) or the like. Due to the bumper cover 14 being mounted, the sensors 30 and the sensor protectors 40 are accommodated at the vehicle inner side of the bumper cover 14 (see FIG. 1).

(Conclusion)

As described above, the present embodiment has the following features and effects corresponding thereto.

A first feature is that the sensor protector 40 of the present embodiment has the mounting portions 42 that are mounted to the bracket 20, the covering portion 44 that is plate-shaped and extends from the lower portions of the mounting portions 42 toward the bumper cover 14 and covers the lower portion of the sensor 30, and the groove portions 46 that are provided at the covering portion 44 and that are weak portions that make the covering portion 44 elastically deformable.

Here, the vehicle lower side of the bumper cover 14 of the present embodiment, which is the road surface side of the sensor 30, is open. Therefore, when the sensor 30 is directly facing the road surface side, there is the concern that problems such as the following will occur. For example, there are the concerns that stones that are thrown-upward during traveling will penetrate into the interior of the bumper cover 14 and directly break the sensor 30, and that snow that swirls around at the periphery will penetrate into the interior of the bumper cover 14 and stick to the periphery of the sensor and cause malfunctioning of the sensor 30. To address this, in accordance with the above-described, first feature, the lower portion of the sensor 30 is covered by the covering portion 44, and, due thereto, the sensor 30 can be protected even if stones that are thrown-upward during traveling, or snow that swirls around at the periphery, or the like penetrate into the interior of the bumper cover 14.

In the present embodiment, because a space is provided between the bumper cover 14 and the back panel 12 that serves as a vehicle structural member, at the time of a collision of the vehicle 10, it is difficult for the impact of the bumper cover 14 to be transmitted to the back panel 12. However, in the case of a mounting member in which a bracket for body mounting and a protector that covers the periphery of the sensor are made integral, there are cases in which the vehicle body deforms when the mounting member itself is pushed toward the vehicle inner side accompanying the deformation of the bumper cover, even if the collision is a light collision. Accordingly, in the case of a mounting member in which the bracket and the protector are made integral, at the time of a collision of the vehicle 10 there are cases in which repair costs not only for the bumper cover, but also for the vehicle body, are additionally incurred. To address this, in accordance with the first feature, even if the amount of deformation of the body is large and the inner wall of the bumper cover 14 contacts the sensor protector 40, the covering portion 44 deforms due to the groove portions 46 that serve as weak portions, and therefore, it is difficult for impact of the bumper cover 14 to he transmitted to the back panel 12. As described above, in accordance with the first feature, both protection of the sensor 30 and lowering of the collision force that the bumper cover 14 applies to the back panel 12 can be achieved.

A second feature is the point that the weak portions are the groove portions 46 that are grooves that are formed along the width direction of the sensor 30. In the present embodiment, the groove portions 46 are formed in the device upper side surface of the covering portion 44. In accordance with this second feature, a reduction in the collision force that the bumper cover 14 applies to the back panel 12 can be devised by the simple structure of merely providing the grooves.

Note that the weak portions of the present embodiment are the groove portions 46 that are four grooves that are in a row along the device width direction at the covering portion 44. However, the weak portion is not limited to this provided that a groove or grooves are formed in a direction orthogonal to the direction of a line connecting the shortest distance between the bumper cover 14 and the back panel 12. For example, the weak portion may be one groove that runs along the device width direction. Further, the number of grooves that form the groove portions 46 is not limited to four. For example, the weak portions may be plural grooves that are provided in the covering portion 44 along the device width direction so as to be lined-up in the device front-rear direction. These grooves that form the weak portions are not limited to being formed in the device upper side surface, and may be formed in the device lower side surface. Moreover, in a case of providing plural grooves in the device front-rear direction, the grooves may be provided alternately at the device upper side surface and the device lower side surface.

A third feature is the point that the arcuate portion 44D, which is the bumper cover 14 side end portion of the covering portion 44 is formed along the inner wall of the bumper cover 14. In accordance with the third feature, by making the covering portion 44 correspond to the shape of the bumper cover 14, differences in the mounting positions at the front and the rear and the left and the right, and different types of vehicles, can he accommodated. Namely, the bracket 20 and the sensor 30 can be utilized commonly, and can be made to correspond to designs of different vehicle regions or vehicle types by preparing the sensor protectors 40 at which only the design of the covering portion 44 is changed. Due thereto, as compared with a mounting member in which a protector and a bracket for body mounting are made integral, the bracket and the protector can be made compact, and the space for storage as inventory can be reduced.

A fourth feature is the point that the mounting portion 42 has the clip 50, which is anchored to the mounting hole 26 formed in the bracket 20, and the plural ribs 52, which stand upright from the mounting portion 42 and which push against the bracket 20 in the state in which the clip 50 is anchored to the bracket 20. As described above, when the anchored position of the clip 50 on the bracket 20 in the device front-rear direction is considered to be a reference position, the ribs 52 (the upper rib 52A, the lower rib 52B) are set to dimensions so as to project-out from the bracket 20 toward the device front side by about 0.3 mm. Accordingly, when the clip 50 is anchored to the bracket 20, the ribs 52 move rearward by 0.3 mm toward the device rear side and push the bracket 20. Further, pulling-in force toward the device rear side arises at the clip 50 that is disposed between the upper rib 52A and the lower rib 52B. In this way, in accordance with the fourth feature, by providing a region that pushes against the bracket 20, the occurrence of rattling at the bracket 20 can be suppressed.

In addition, the sensor protector 40 of the present embodiment has the feature that it can be mounted to the vehicle 10 (the bracket 20) after the sensor 30 has been fixed to the vehicle 10. Further, because the fixing of the sensor protector 40 to the bracket 20 is carried out by the clips 50 that are made of resin, there is no need for a tool therefor. Namely, in accordance with the sensor protector 40 of the present embodiment, because the mounting of the sensor protector 40 to the vehicle 10 is easy, the number of processes at the time of manufacturing the vehicle can be reduced. Moreover, even if the sensor protector 40 breaks at the time of a collision of the vehicle 10, the replacement work is easy.

Note that, at the time of mounting the sensor protector 40 to the bracket 20. In a case in which the gap between the covering portion 44 and the bumper cover 14 is large, or in a case in which it is desired to further mitigate impact from the bumper cover 14, a strip-shaped sponge may be affixed to the wall portion 44E of the covering portion 44.

The sensor protector 40 of the present embodiment is mounted to the sensor 3C) that is set at a rear corner portion of the vehicle 10 at the vehicle inner side of the bumper cover 14. However, the present embodiment is not limited to this. For example, the sensor protector 40 may be mounted to a sensor that is set at a front corner portion of the vehicle 10 at the vehicle inner side of a bumper cover (not illustrated). Further, the sensor 30 to which the sensor protector 40 is mounted is not limited to being set at a corner portion of the vehicle 10, and may be set at the vehicle transverse direction center.

Although an embodiment of the present disclosure has been described above, the present disclosure is not limited to the above, and, of course, can be implemented by being modified in various ways other than the above within a scope that does not depart from the gist thereof.

What is claimed is:

1. A sensor protector, comprising:
   mounting portions that are mounted to a bracket for fixing a sensor, which is provided at a vehicle inner side of a bumper cover, to a body of a vehicle;
   a covering portion that is plate-shaped, that extends from lower portions of the mounting portions toward the bumper cover, and that covers a lower portion of the sensor; and
   a weak portion that is provided at the covering portion and makes the covering portion elastically deformable.

2. The sensor protector of claim 1, wherein the weak portion comprises a groove that is formed along a width direction of the sensor.

3. The sensor protector of claim 1, wherein an end portion of the covering portion at a bumper cover side has a shape that corresponds to the shape of an inner wall of the bumper cover.

4. The sensor protector of claims 1, wherein each of the mounting portions has:
   a clip that is anchored to a hole formed in the bracket, and
   a plurality of ribs that stand upright from the mounting portion, and that push against the bracket in a state in which the clip is anchored to the bracket.

5. The sensor protector of claims 1, wherein the mounting portions have plate-shaped members that are provided as a pair in a width direction of the sensor with the sensor disposed therebetween.

6. The sensor protector of claims 1, wherein the covering portion has, at a central portion thereof in a width direction of the sensor, an open portion that opens at a sensor side.

7. The sensor protector of claims 1, wherein the covering portion has:
   a plate portion that extends from the mounting portions toward a rear side of the sensor, and
   a wall portion that extends from the plate portion toward a lower side of the sensor.

8. A vehicle, comprising:
   the sensor protector of claims 1;
   the sensor:
   the bracket, which is fixed to the body of the vehicle; and
   the bumper cover, which is open at a road surface side of the sensor.

* * * * *